(12) United States Patent  
Golia et al.

(10) Patent No.: US 7,450,498 B2
(45) Date of Patent: Nov. 11, 2008

(54) FAULT TOLERANT NETWORK ARCHITECTURE

(75) Inventors: Anthony Golia, Great Neck, NY (US); J. Rambhaskar, Hackensack, NJ (US); Thomas Schwarz, Oceanside, NY (US)

(73) Assignee: Morgan Stanley, New York, NY (US)

( * ) Notice: Subject to any disclaimer, the term of this patent is extended or adjusted under 35 U.S.C. 154(b) by 755 days.

(21) Appl. No.: 10/974,563

(22) Filed: Oct. 27, 2004

(65) Prior Publication Data

US 2006/0087962 A1    Apr. 27, 2006

(51) Int. Cl.
*H04L 12/28* (2006.01)
*H04L 12/56* (2006.01)

(52) U.S. Cl. .................................. 370/225; 370/228
(58) Field of Classification Search ......... 370/216–228, 370/400, 401
See application file for complete search history.

(56) References Cited

U.S. PATENT DOCUMENTS

| 5,917,997 | A  | * | 6/1999  | Bell et al. ................. 714/4 |
| 5,923,854 | A  | * | 7/1999  | Bell et al. .................. 709/243 |
| 6,148,410 | A  |   | 11/2000 | Baskey et al. |
| 6,327,675 | B1 |   | 12/2001 | Burdett et al. |
| 6,430,622 | B1 |   | 8/2002  | Aiken, Jr. et al. |
| 6,657,974 | B1 | * | 12/2003 | Britton et al. ............. 370/255 |
| 6,704,278 | B1 | * | 3/2004  | Albert et al. .............. 370/216 |
| 6,718,383 | B1 |   | 4/2004  | Herbert |
| 6,718,387 | B1 |   | 4/2004  | Gupta et al. |
| 6,725,261 | B1 |   | 4/2004  | Novaes et al. |
| 6,728,780 | B1 |   | 4/2004  | Herbert |
| 6,766,348 | B1 |   | 7/2004  | Combs et al. |
| 6,862,697 | B1 |   | 3/2005  | Moran et al. |
| 6,954,794 | B2 | * | 10/2005 | Rudd et al. .................. 709/230 |
| 7,006,431 | B1 | * | 2/2006  | Kanekar et al. ............. 370/217 |
| 7,010,716 | B2 | * | 3/2006  | Yu et al. ........................ 714/4 |
| 2002/0027877 | A1 |   | 3/2002  | Son et al. |
| 2002/0156893 | A1 |   | 10/2002 | Pouyoul et al. |
| 2003/0009551 | A1 |   | 1/2003  | Benfield et al. |
| 2003/0018813 | A1 |   | 1/2003  | Antes et al. |
| 2003/0026254 | A1 |   | 2/2003  | Yong |
| 2003/0065974 | A1 |   | 4/2003  | Lam et al. |
| 2003/0208618 | A1 |   | 11/2003 | Mor et al. |
| 2004/0027377 | A1 |   | 2/2004  | Hays et al. |
| 2004/0042418 | A1 |   | 3/2004  | Hamada et al. |
| 2004/0076160 | A1 |   | 4/2004  | Phaltankar |

(Continued)

OTHER PUBLICATIONS

Search Report, European Patent Office, Application No. 05023157.0, dated Mar. 3, 2006.

(Continued)

*Primary Examiner*—Min Jung
(74) *Attorney, Agent, or Firm*—Kirkpatrick & Lockhart Preston Gates Ellis LLP (57) ABSTRACT

A fault tolerant network architecture employs a network node including a first network interface to an addressable network. The first network interface is assigned a first network interface IP address defined by a first IP address range. The network node also includes at least one virtual IP address defined by an IP address range outside of the first IP address range. At least one virtual address is advertised to the addressable network from the first network interface, and packets addressed to the at least one virtual IP address can be routed to the first network interface.

21 Claims, 4 Drawing Sheets

U.S. PATENT DOCUMENTS

| | | |
|---|---|---|
| 2004/0078481 A1 | 4/2004 | Rudd et al. |
| 2004/0078625 A1 | 4/2004 | Rampuria et al. |
| 2004/0133690 A1* | 7/2004 | Chauffour et al. ........... 709/229 |
| 2004/0193942 A1 | 9/2004 | Barr et al. |
| 2005/0022048 A1 | 1/2005 | Croch |

OTHER PUBLICATIONS

Sullivan, J., "Network Fault Tolerance System," thesis, Worcester Polytechnic Institute, May 2000.

Zhao, B. et al., "Tapestry: An Infrastructure for Fault-Tolerant Wide-area Location Routing," Report No. UCB/CSD-01-1141, Apr. 2001, Computer Science Division, University of California, Berkeley.

Crocker, M. et al., "Fault-Tolerant Reconfigurable Ethernet-Based IP Network Proxy," CIIT 2003.

Zagorodnov, D. et al., "Engineering Fault-Tolerant TCP/IP Servers Using FT-TCP," Proceedings of the 2003 International Conference on Dependable Systems and Networks (DSN 2003), Jun. 22-25, 2003, San Francisco, CA.

Sun Microsystems, User's Guide, Wireless Toolkit, Dec. 2003, Java 2 Platform, Micro Edition, 90 pages, XP 002325476.*

Jones, B.L., "Mobile/PocketPC Development Jump Start", Internet Citation, http://www.developer.com, Jul. 9, 2004, 6 pages.*

* cited by examiner

FAULT TOLERANT NETWORK ARCHITECTURE

TECHNICAL FIELD

The present invention relates generally to systems and methods for improving network availability and, more particularly, to systems and methods for improving network availability by employing a fault tolerant network architecture.

BACKGROUND

In an Internet Protocol (IP) network, it is critical to minimize downtime and achieve high availability. One method for achieving high availability involves sharing single or multiple IP addresses between two (or more) network hosts. The act of switching ownership of a shared IP address between hosts is referred to as floating, and the shared IP address is referred to as the floating IP address. Only one host can own the floating IP address at any given instant in time.

Hosts that are configured to float IP addresses among them are referred to as High Availability (HA) nodes. All the HA nodes that potentially can own the floating IP address make up an HA cluster. Only one HA node in the HA cluster can own the IP address at any given instant in time. Within the HA cluster, the HA nodes monitor each other using a heartbeat protocol, for example, so each HA node knows which one should own the floating IP address.

There are several problems with current methods for achieving high availability. One problem is that HA nodes typically must be located on the same Local Area Network (LAN). That is, the same LAN must be physically co-located with the HA nodes. This limitation is due to the fact that IP addresses do not reliably traverse off a given LAN and puts stringent constraints on the location and distance allowed between HA nodes.

Another problem is evident when hosts attempt to provide load balancing and/or redundancy among different physical interfaces. Namely, in such cases, all redundant interfaces must be on the same LAN because the interfaces share the same IP address. Consequently, an HA node may prematurely fail over its IP addresses due to a recoverable local network failure. This would incur extensive latency and startup work due to failover. This limitation is especially apparent when HA nodes are connected to multiple LANs, and the failure of a single LAN results in unavailability of the HA node. In addition, because a LAN may be considered a single point of failure, the failure of one network device can make all interfaces on a given LAN inoperable.

Accordingly, there exists a need for improved methods and systems for floating IP addresses between HA nodes, as well as for improved local subnet failure detection and recovery.

SUMMARY

In one general aspect, a fault tolerant network architecture employs a network node including a first network interface to an addressable network. The first network interface is assigned a first network interface IP address defined by a first IP address range. The network node also includes at least one virtual IP address defined by an IP address range outside of the first IP address range. The at least one virtual address is advertised to the addressable network from the first network interface, and packets addressed to the at least one virtual IP address can be routed to the first network interface.

In another aspect, a fault tolerant method includes configuring a node with one or more virtual IP addresses, advertising the one or more virtual IP addresses to network devices of an addressable network, monitoring one or more default routers, and floating the one or more virtual IP addresses between nodes.

Aspects of the present invention may be implemented by a computer system and/or by a computer program stored on a computer-readable medium. The computer-readable medium may comprise a disk, a device, and/or a propagated signal.

Other features and advantages will be apparent from the following description, including the drawings, and from the claims.

DETAILED DESCRIPTION

In various embodiments, the present invention is directed to a fault tolerant network architecture for improving network availability. It should be understood that the systems and methods described below may include various other elements and/or processes in actual implementation.

Figure 1:
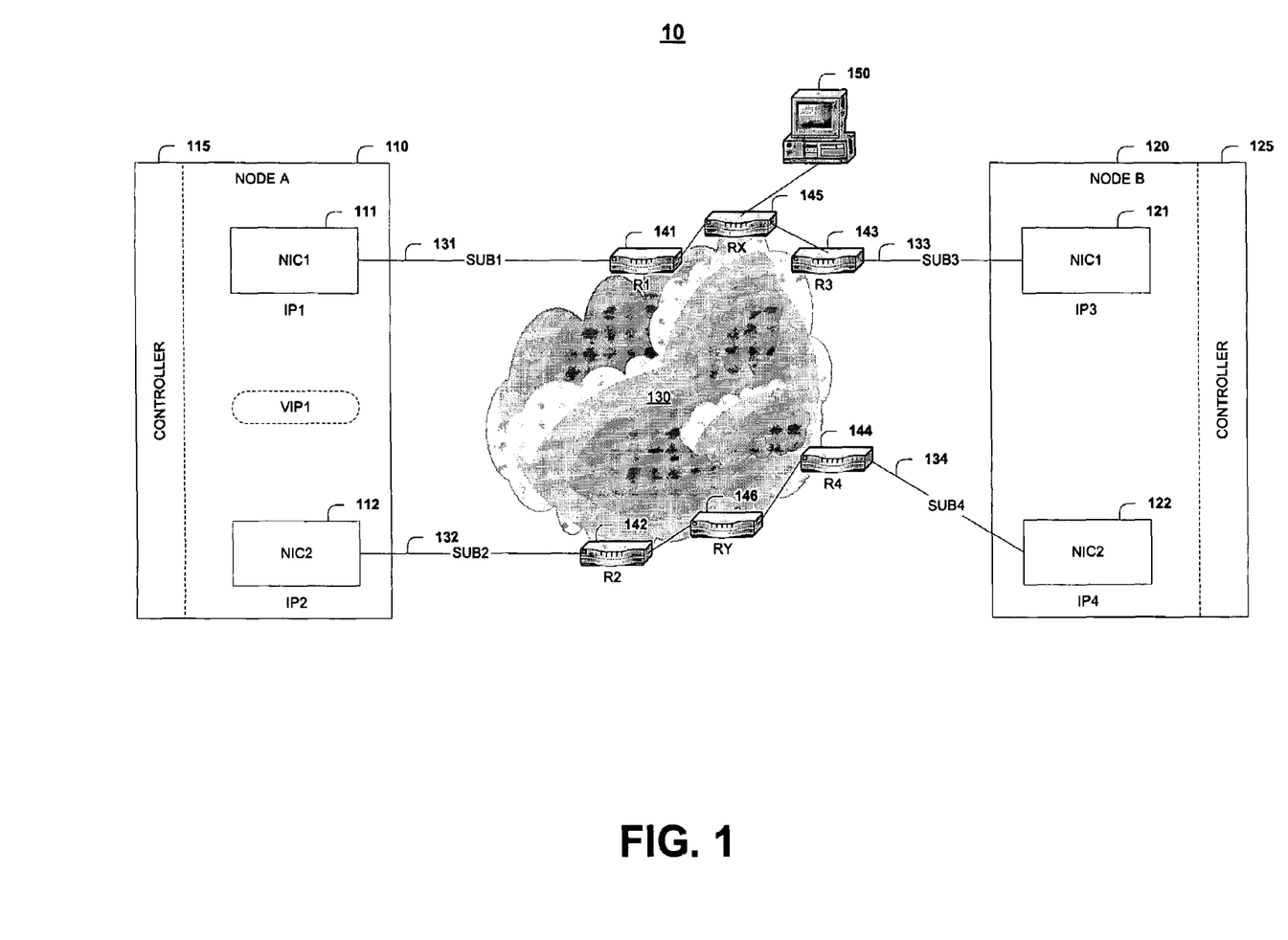
FIG. 1 illustrates a fault tolerant network according to one embodiment of the present invention.

FIG. 1 illustrates one embodiment of a fault tolerant network 10 according to aspects of the present invention. In this embodiment, the fault tolerant network 10 includes a first node (Node A) 110 and a second node (Node B) 120. It is to be understood that the fault tolerant network 10 may include any number of nodes in various implementations.

Each of the nodes 110, 120 may be a host or server such as computer or computer system for providing resources to one or more users. In general, the nodes 110, 120 include hardware and software components for communicating with each other through a network 130. The nodes 110, 120 may be structured and arranged to communicate using various communication and/or routing protocols.

In one implementation, the first node 110 is configured to operate in response to a first host controller 115 and the second node 120 is configured to operate in response to a second host controller 125. The broken lines are intended to indicate that in some implementations, the host controllers 115, 125 or portions thereof, may instruct one or more elements of the nodes 110, 112 to operate as described.

Examples of a host controller 115, 125 include, but are not limited to a computer program, a software application, computer code, set of instructions, plug-in, microprocessor, virtual machine, device, or combination thereof, for independently or collectively instructing one or more computing devices to interact and operate as programmed. In general, the host controllers 115, 125 may utilize any suitable algorithms and computing language and may be embodied permanently or temporarily in any type of computer, computer system, device, machine, component, physical or virtual equipment, storage medium, or propagated signal capable of delivering instructions. The host controllers 115, 125 when implemented as software or a computer program, for example, may be stored on a computer-readable medium (e.g., device, disk, or propagated signal) such that when a computer reads the medium, the functions described herein are performed.

As shown in FIG. 1, the nodes 110, 120 include at least one physical network interface card (NIC) for connecting to the network 130. In general, a NIC is a connection point or uplink to the network 130. In one embodiment, the first node 110 is configured with a first network interface card (NIC1) 111 and a second NIC (NIC2) 112. The second node 120 is configured with a first NIC (NIC1) 121 and a second NIC (NIC2) 122. In various embodiments, the nodes 110, 120 may include additional NICs.

In one implementation, the network 130 includes or forms part of an addressable IP network, such as a Local Area Network (LAN). In such implementations, each network device must be represented by a unique IP address at any given point in time. The IP addressing scheme enables applications to contact a particular network device host using its IP address.

In one embodiment, a first IP address (IP1) is bound to the first NIC 111 on the first node 110, a second IP address (IP2) is bound to the second NIC 112 on the first node 110, a third IP address (IP3) is bound to the first NIC 121 on the second node 120, and a fourth IP address (IP4) is bound to the second NIC 122 on the second node 120.

In various implementations, the network 130 may include or form part of any type of addressable network including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 130 may include elements, such as, for example, intermediate nodes, proxy servers, routers, switches, and adapters configured to direct and/or deliver data. In various embodiments, the network 130 may operate within or in concert with one or more other communications systems.

In one embodiment, the network 130 is configured to include a plurality of subnets (SUB1-SUB4) 131-134. In general, a subnet is a portion of a network in which network devices share a common address component, such as a common IP prefix. The subnets can be created on top of the network 130 (e.g., LAN) by configuring subnet interfaces with a contiguous range of IP addresses. For instance, the first subnet (SUB1) 131 can be configured with IP prefix 10.10.10., and the second subnet (SUB2) 132 can be configured with the IP prefix 11.11.11.

In various implementations, each of the nodes 110, 120 may be physically connected to more than one subnet or "multihomed." In general, a multihomed host may have multiple physical network interfaces connected to different subnets or LANs and may have one (or more) IP addresses on each subnet or LAN.

In one embodiment, the first node 110 is connected to the first subnet (SUB1) 131 by the first NIC (NIC1) 111 and is connected to the second subnet (SUB2) 132 by the second NIC (NIC2) 112. The second node 120 is connected to the third subnet (SUB3) 133 by the first NIC (NIC1) 121 and is connected to the fourth subnet (SUB4) 134 by the second NIC (NIC2) 122.

As shown, the network 130 also includes several routers (R1-R4, RX and RY) 141-144, 145 and 147. In general, the routers are network devices configured to direct network traffic. In one embodiment, the first router (R1) 141 is connected to the first subnet 131, the second router (R2) 142 is connected to the second subnet 132, the third router (R3) 143 is connected to the third subnet 133, and the fourth router (R4) 144 is connected to the fourth subnet 134. In one embodiment, the network 130 includes a fifth router (RX) 145 for connection to a client system 150 and a sixth router (RY) 146 connecting the second router (R2) 142 and the fourth router (R4) 144. In various implementations, the network 130 may include other routers (not shown).

The first router (R1) 141 is aware of the IP address (IP1) of the first NIC (NIC1) 111 of the first node 110, and the second router (R2) 142 is aware of the IP address (IP2) of the second NIC (NIC2) 112 of the first node 110. The third router (R3) 143 is aware of the IP address (IP3) of the first NIC (NIC1) 121 of the second node 120, and the fourth router (R4) 144 is aware of the IP address (IP4) of the second NIC (NIC2) 122 of the second node 120.

In various embodiments, the client system 150 is configured to request and receive information from the network 130. The client system 150 may be connected to the network 130 through one or more wired and/or wireless data pathways and may include client devices. Examples of client devices include, a personal computer (PC), a workstation, a laptop computer, a network-enabled personal digital assistant (PDA), and a network-enabled mobile telephone. Other examples include, but are not limited to, a microprocessor, an integrated circuit, or any other component, machine, tool, equipment, or some combination thereof capable of responding to and executing instructions.

In various implementations, the nodes 110, 120 are configured to back each other up in a redundant and scalable manner for providing high availability (HA). For example, HA nodes may operate as a hot-cold pair such that only one node is actively serving applications at a given time. In addition, the HA nodes may be located in different physical sites so that disaster conditions are isolated to a single node. In the event one node of a HA cluster fails, applications shift to another HA node. IP addresses may be floated among HA nodes in an HA cluster so that applications are redirected to an operable HA node.

In various implementations, the first node 110 is configured to include at least one virtual IP address (VIP). One or more VIP addresses may be floated among HA nodes in a HA cluster. In one embodiment, the first node 110 is configured to include a VIP address (VIP1) that is not coupled to any physical interface or subnet. For example, the VIP1 is not bound to any physical NIC (e.g., NIC1 or NIC2) or any subnet (e.g., SUB1-SUB4) of the network 130. Rather, VIP1 may be assigned to a virtual interface with its own, unique subnet.

In one implementation, one or more VIP addresses are assigned to a loop back interface or a loop back adapter of the first node 110. In various embodiments, the loop back interface of the first node 110 includes a predetermined loop back IP address (e.g., 127.0.0.1). The predetermined IP address of the loop back interface remains unchanged, while one or more VIP addresses are additionally assigned to the loop back interface.

In various embodiments, each of the one or more VIP addresses assigned to the loop back interface is defined with a special subnet mask or logical bit mask. In general, a subnet mask defines the size or range of the subnet. In one implementation, the VIP1 address is configured with a 32-bit network mask (e.g., 255.255.255.255 in IP version 4) so that it is not tied to any other IP subnet.

The one or more VIP addresses and subnet masks are advertised from the first node 110 (or second node 120) to other devices in the fault tolerant network 10. For instance, the first node 110 may advertise the VIP1 address and corresponding subnet mask to other network devices using a routing protocol. The VIP1 address may be simultaneously advertised to the first subnet (SUB1) 131 with a first source IP address (IP1) and to the second subnet (SUB2) 132 with a second source IP (IP2). Examples of a routing protocol include, but are not limited to, the Routing Information Protocol (RIP) or Open Shortest Path First (OSPF) protocol. In general, the routing protocol propagates the VIP addresses and corresponding subnet masks throughout the network.

Network devices, such as routers for example, are informed of the VIP addresses and subnet masks and, in response, route packets to the node. Because the routers in the network do not have a preconception about the subnet the VIP is on, the routers will accept the VIP addresses for routing packets. For example, the second router (R2) 142 typically is aware of the IP ranges associated with the first subnet (SUB1) 131 and maybe others. The second router (R2) 142 will notice that advertised VIP1 does not fit in the IP ranges of any subnet it is aware of. Because the second router (R2) 132 also receives the 32 bit subnet mask for VIP1, it calculates that it does not exist in any subnet R2 knows about, and accepts the VIP1 address for routing packets to the first node 110.

Figure 2:
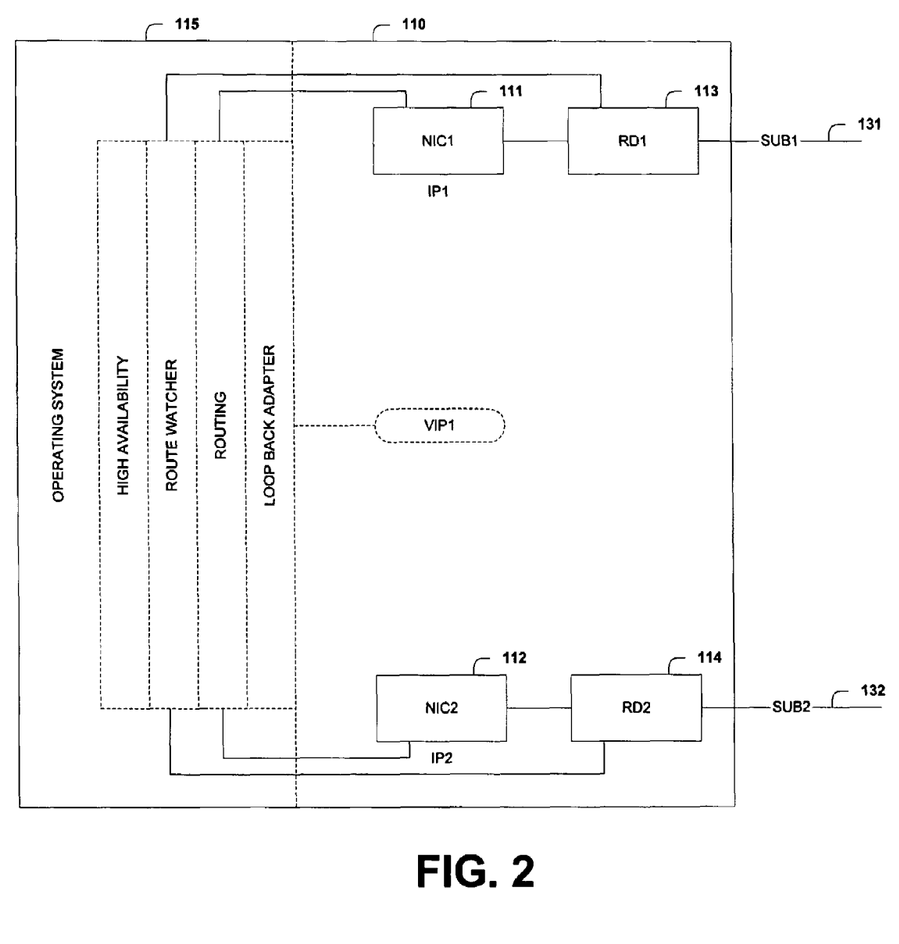
FIG. 2 illustrates a fault tolerant network node according to one embodiment of the present invention.

FIG. 2 illustrates one embodiment of a fault tolerant network node 110 according to further aspects of the present invention. As shown, the node 110 includes a first NIC (NIC1) 111, a second NIC (NIC2) 112, a first default router (RD1) 113, a second default router (RD2) 114, and a host controller 115.

As shown, the host controller 115 includes an operating system. Examples of an operating system include, but are not limited to, Linux, Solaris, and Windows. In various embodiments, the host controller 115 or operating system includes a loop back adapter or loop back interface provided in software and/or memory. In general, the loop back interface is not tied to any physical NIC and is substantially immune to any physical failure.

In various implementations, one or more VIP addresses (e.g., VIP1) are assigned to the loop back interface. In addition, the one or more VIP addresses are defined with a special subnet mask (e.g., 255.255.255.255 in IP version 4) so that the VIP addresses are not coupled to any physical interface (e.g., NIC1, NIC2) or subnet (e.g., SUB1, SUB2). The loop back interface may be assigned a predetermined IP address (e.g., 127.0.0.1) that remains unchanged while one or more VIP addresses are additionally assigned to the loop back interface.

The node 110 also includes routing software. In general, various software implementations (e.g., Zebra, GateD, RouteD) of routing protocols may be utilized in accordance with the present invention. The routing protocol is modified or configured to advertise one or more VIP addresses (e.g., VIP1) with the corresponding subnet mask to other network devices.

In one implementation, the routing protocol is configured to simultaneously advertise the VIP1 address and subnet mask from the first NIC (NIC1) 111 and the second NIC (NIC2) 112 so that VIP1 and subnet mask is propagated to various network devices. In one embodiment, the routing table entry for VIP1 in the first router (R1) 131 maps to the IP address (IP1) of the first NIC (NIC1) 111, and the routing table entry for VIP1 in the second router (R2) 132 maps to the IP address (IP2) of the second NIC (NIC2) 112.

In various implementations, the operating system is configured to provide the node 110 with one or more default routers, such as a first default router 113 and a second default router 114, for example. In general, the default routers 113, 114 are capable of directing incoming and/or outgoing network traffic for the node 110. The first default router 113 may direct outgoing traffic for the first NIC (NIC1) 111, and the second default router 114 may direct outgoing traffic for the second NIC (NIC2) 112.

In various embodiments, the host controller 115 includes a route watcher program for monitoring the operations of the default routers 113, 114. In one implementation, route watcher program may be implemented as a user level process and may include one or more software algorithms running on the operating system. The route watcher program may perform a monitoring test, such as a ping test, for example, to determine whether the default routers 113, 114 are operating properly.

If the route watcher program determines that one of the default routers 113, 114 is inoperable, it is removed as a default router. The route watcher program ensures that packets are routed or rerouted to an operable router. The route watcher program may monitor the default routers 113, 114 continuously and may add a router when it becomes operable again. In some implementations, the host controller 115 is configured to provide load balancing of outgoing packets between the two default routers 113, 114.

One example of pseudocode that may be used to implement the route watcher program is as follows:

```
while ( TRUE ) {
    for each NIC router association {
        if ( router passes monitor test ) {
            router_ok_count++;
        }
        if ( router_ok_count != last_router_ok_count ) {
            last_router_ok_count == router_ok_count;
            if ( router was marked failed ) {
                mark router as good;
                add router as default route out NIC;
            }
        }
        else {
            mark router as failed;
            remove router from NIC's default router list;
        }
    }
    sleep for some time;
}.
```

In one embodiment, the host controller 115 also includes high availability (HA) software. In one implementation, the node 110 forms part of an HA cluster and the HA software is configured to monitor the health of HA nodes within the HA cluster. The HA software may use a heartbeat protocol and constantly communicate among HA nodes. If the HA node that owns VIP1 address goes down, the VIP1 address is floated to and configure on another HA node in the HA cluster, where it is then advertised by a suitable routing protocol.

Figure 3:
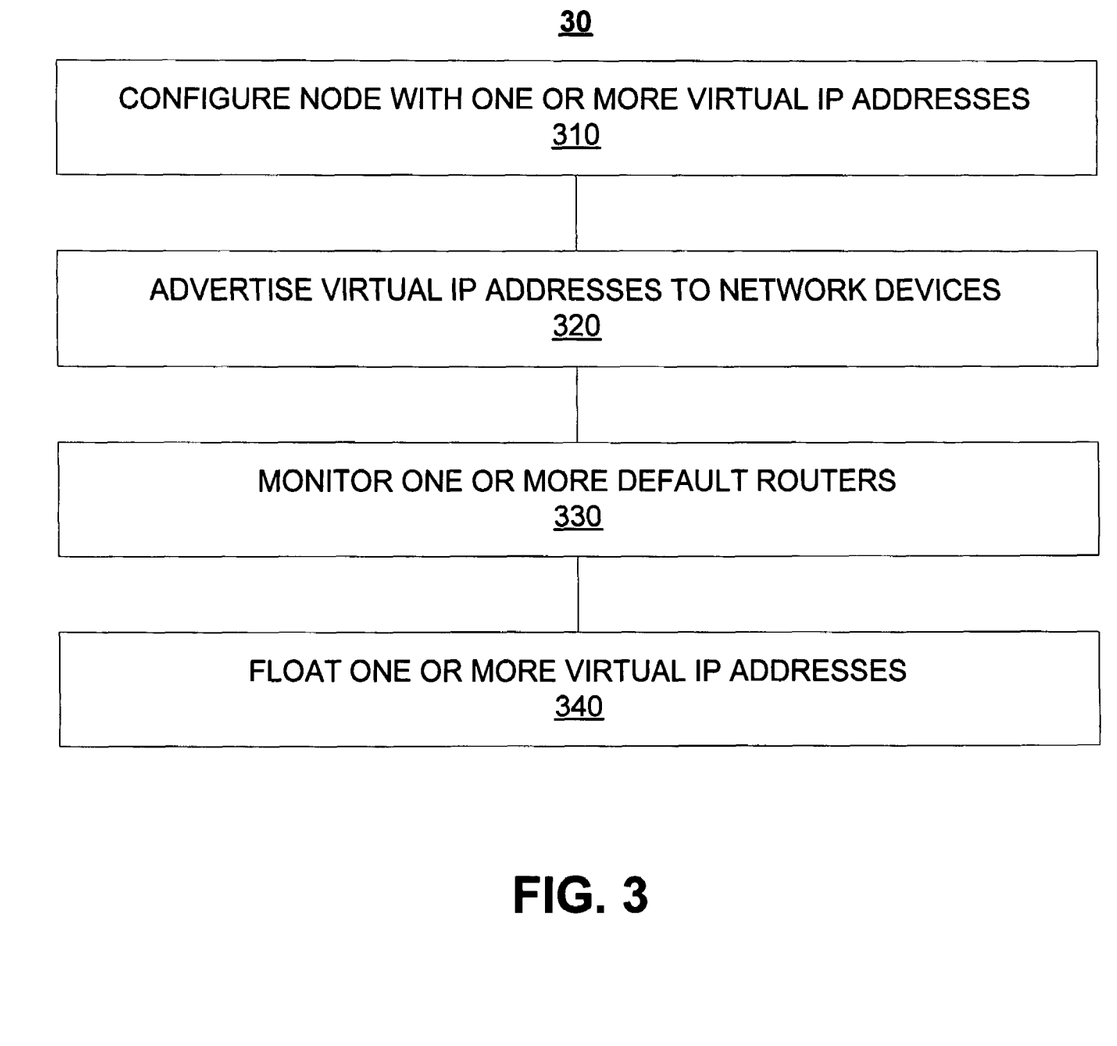
FIG. 3 illustrates a fault tolerant network method according to one embodiment of the present invention.

FIG. 3 illustrates one embodiment of a method 30 for improving network availability according to aspects of the present invention. In one implementation, the method 30 may be implemented by hardware (e.g., device, computer, computer system, equipment, component); software (e.g., program, application, instruction set, code); storage medium (e.g., disk, device, propagated signal); or combination thereof. It should be noted, however, that the method 10 may be performed in any manner consistent with aspects of the present invention.

At step 310, at least one node is configured with one or more VIP addresses. In one implementation, a virtual IP address (VIP1) is assigned to a first node (e.g., Node A 110).

In general, the one or more VIP address are not coupled to any physical interface (e.g., NIC1, NIC2) or subnet (e.g., SUB1, SUB2).

In various embodiments, the one or more VIP address are assigned to a virtual interface such as a loop back interface or loop back adapter of the node. The loop back interface may be assigned a predetermined loop back interface IP address (e.g., 127.0.0.1) that remains intact while one or more additional VIP addresses are assigned. The one or more VIP addresses may be defines with a subnet mask (e.g., 255.255.255.255) so that the VIP addresses exist outside the boundaries of any physical interface or subnet (e.g., SUB1, SUB2). In effect, the VIP1 address is defined to exist in its own subnet.

At step, 320, the one or more VIP addresses are advertised to one or more network devices. In one implementation, VIP1 is advertised by NIC1 and/or NIC2, using an IP routing protocol. The routing protocol may include a routing metric or cost and may be implemented by suitable routing software.

An HA node may be configured to simultaneously advertise VIP1 out of NIC1 and NIC2 with the same routing cost or metric. Network devices such as the routers on various subnets (e.g., SUB1 and SUB2) accept these routing updates and propagate them to other routers in the network. Some routers and routing protocols are capable of load balancing among multiple, equal cost routes. Upon being informed of VIP1, the router (R1) on SUB1 creates an entry for VIP1 pointing to IP1, and the router (R2) creates an entry for VIP1 pointing to IP2.

If the routing protocol supports load balancing among equal cost routes (e.g. OSPF), traffic addressed to VIP1 from subnets other than SUB1 or SUB2 is load balanced among available physical interfaces (e.g., NIC1 and NIC2). If a physical interface (e.g., NIC2) fails, the corresponding router (e.g., R2) no longer receives routing updates from the failed physical interface. The router (e.g., R2) then would drop the entry for VIP1 to the corresponding physical IP address (IP2) from its routing table. In the case of where load balancing with equal cost routing applies, all traffic addressed to VIP1 coming from subnets other than SUB1 or SUB2 would come in to the remaining physical interface (e.g., NIC1). This avoids an outage for incoming traffic to VIP 1.

At step 330, one or more default routers are monitored. In one implementation, a first node (e.g., Node A 110) is configured with one or more default routers (RD1 and/or RD2) and the operating system supports load balancing of outgoing traffic among the multiple default routers. In this implementation, outgoing traffic going to subnets other than SUB1 or SUB2 is load balanced among the available physical interfaces (e.g., NIC1 and NIC2). In some implementations, only one default router may be used.

In various implementations, performance of default routers is closely monitored. In some cases, a route watcher program monitors the health of the default routers (e.g., RD1 and RD2) and replaces or deletes unreachable routers from a routing table. The route watcher program may also detect expected network traffic (e.g. multicast advertisements) from the default routers for monitoring health and performance.

In some embodiments, the route watcher program is further configured to monitor the operability of network devices (e.g., RX, RY) beyond the default routers (e.g., RD1 and RD2). For example, the route watcher program can be configured to perform fault detection of physical routers on different subnets. A monitoring test (e.g., ping test) can be employed to determine whether such network devices (e.g., RX, RY) are reachable by the node (e.g., Node A 110).

At step 340, one or more VIP addresses are floated. In one implementation, two or more nodes (e.g., Node A 110 and Node B 120) may operate as HA nodes that can potentially own a floating VIP address (e.g., VIP1) within an HA cluster. In some cases, the nodes 110, 120 can form part of a larger HA cluster.

In general, only one HA node in the HA cluster can own the VIP address at any given instant in time. In various embodiments, the HA nodes monitor each other, using a heartbeat protocol, for example, so that each HA node knows which one should own the floating VIP address.

In the event that one HA node (e.g., Node A 110) fails, the VIP address (e.g., VIP1) may be floated to and configured on a redundant, backup HA node (e.g., Node B 120). In various implementations, the VIP address is configured on another HA node (e.g., Node B 120) host that is not connected to the same subnets (e.g., SUB1, SUB2) as the original node (e.g., Node A 110). The redundant, backup HA node may be provided in a different location and may be connected to different subnets so that failures are isolated.

After the VIP address is floated to the second node (e.g., Node B 120), routing software on the second node 120 propagates the same VIP with the same mask, but instead advertises the source IP addresses (e.g., IP3 and IP4) assigned to the second node.

In embodiments in which multiple VIP addresses are assigned, advertised, and/or floated among nodes, such multiple VIP address can be grouped according to IP prefix for allowing route summarization. For example, VIP addresses may be assigned common IP prefixes based on physical location and/or VIP addressed with common IP prefixes may be co-located.

The systems and methods described also may find applicability in network that employs blade servers. Blade servers include a number of hosts housed within a single enclosure. The hosts of a blade server are grouped together in one physical enclosure and their network ports are aggregated using one or more switches.

Blade servers present problems when incorporating them into existing LAN in a scalable and redundant manner. Blade servers require fewer physical connections than standard servers making redundancy and load balancing more important because there are fewer uplinks.

Figure 4:
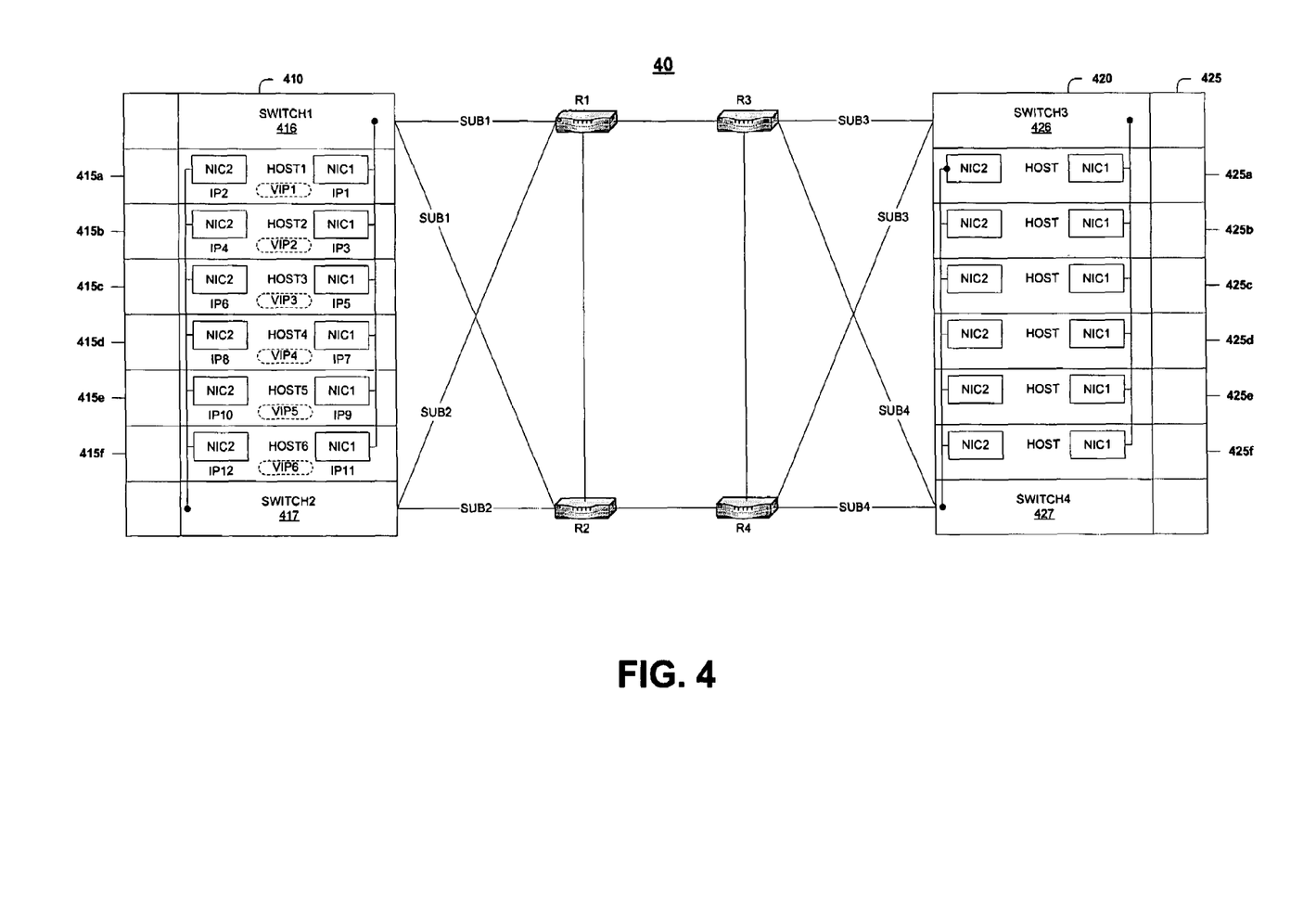
FIG. 4 illustrates a fault tolerant network according to one embodiment of the present invention.

FIG. 4 illustrates on embodiment of a fault tolerant network 40 including a first blade server 410 and a second blade sever 420. The blade servers 410, 420 operate in response to host controllers 415a-f, 425a-f, respectively. As shown, each of the blade servers 410, 420 includes six hosts. Each host includes a first NIC (NIC1) and a second (NIC2) for connecting to subnets (SUB1-SUB4). The first NICs are aggregated on the first blade server node 410 using a first switch 416, and the second NICs are aggregated on the first blade server node 410 using a second switch 417. The first NICs are aggregated on the second blade server node 420 using a first switch 426, and the second NICs are aggregated on the second blade server node 420 using a second switch 427.

In one embodiment, the first node 410 includes a first host (HOST1) assigned a first VIP (VIP1). As shown HOST1 includes a first NIC (NIC1) assigned IP1 and a second NIC (NIC2) assigned IP2. The first node 410 includes a second host (HOST2) assigned a second VIP (VIP2). As shown HOST2 includes a first NIC (NIC1) assigned IP3 and a second NIC (NIC2) assigned IP4. The first node 410 includes a third host (HOST3) assigned a third VIP (VIP3). As shown HOST3 includes a first NIC (NIC1) assigned IP5 and a second NIC (NIC2) assigned IP5. The first node 410 includes a fourth host (HOST4) assigned a fourth VIP (VIP4). As shown HOST4 includes a first NIC (NIC1) assigned IP7 and a second NIC (NIC2) assigned IP8. The first node 410 includes a five host (HOST5) assigned a fifth VIP (VIP5). As shown HOST5 includes a first NIC (NIC1) assigned IP9 and a second NIC (NIC2) assigned IP10. The first node 410 includes a sixth host (HOST6) assigned a sixth (VIP6). As shown HOST6 includes a first NIC (NIC1) assigned IP11 and a second NIC (NIC2) assigned IP12.

The method 30 described above may be performed in the context of blade server nodes 410, 420. In such implementations, the one or more VIP addresses are assigned to the loop back interface of a single host within one of the blade server nodes (e.g., node 410). The one or more VIP addresses and subnet masks can be floated within a blade enclosure and/or between blade server nodes at different locations and/or on different LANs.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium also may include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A network node comprising:
   a first network interface for connecting to an addressable network, wherein the first network interface is assigned a first network interface IP address that is within a first contiguous IP address range for a first subnet connected to the first network interface; and
   at least one virtual IP address that is not associated with a physical interface and that is defined by an IP address range outside of the first contiguous IP address range, wherein the network node is operable to advertise the at least one virtual IP address to the addressable network from the first network interface for routing packets addressed to the at least one virtual IP address to the first network interface.

2. The network node of claim 1, wherein the first network interface comprises a network interface card.

3. The network node of claim 1, wherein the first network interface is connected to a plurality of subnets configured on the addressable network.

4. The network node of claim 1, wherein the addressable network comprises a local area network.

5. The network node of claim 1, wherein at least one virtual IP address is assigned to a loop back interface.

6. The network node of claim 1, wherein at least one virtual address is defined by a subnet mask.

7. The network node of claim 6, wherein at least one virtual IP address and 32 bit subnet mask is advertised to the addressable network.

8. The network node of claim 1, further comprising a second network interface for connecting to said addressable network, said second network interface assigned a second network interface IP address that is within a second IP address range, wherein the IP address range of the virtual IP address is outside of the second IP address range.

9. The network node of claim 8, wherein the network node is operable to advertise the at least one virtual IP address to the addressable network from the second network interface for routing packets addressed to said at least one virtual IP address to at least one of said first network interface and said second network interface.

10. The network node of claim 9, wherein the second network interface is connected to a plurality of subnets configured on the addressable network.

11. The network node of claim 1, wherein the first network interface comprises a network interface card.

12. The network node of claim 1, further comprising a routing program implementing a routing protocol for advertising the at least one virtual IP address.

13. The network node of claim 1, further comprising a plurality of default routers, wherein at least one of the default router is connected to the first network interface.

14. The network node of claim 13, further comprising a host controller having a router watcher program for monitoring the plurality of default routers, wherein the host controller is connected to the plurality of default routers.

15. The network node of claim 14, wherein the route watcher program is configured to remove an inoperable default router.

16. The network node of claim 1, further comprising a host controller having a high availability program for floating the at least one virtual IP address to a second network node.

17. A network node comprising:
   a first network interface for connecting to a first subnet of an addressable network, wherein the first network interface is assigned a first network interface IP address that is within a first contiguous IP address range for the first subnet; and
   a host controller in communication with the first network interface, wherein the host controller comprises a loop back interface having assigned to it at least one virtual IP address that is outside of the first contiguous IP address range, and wherein the host controller is for advertising the one or more virtual IP addresses and a corresponding subnet mask to network devices of the addressable network.

18. The network node of claim 17, further comprising at least one default router connected to the network interface, and wherein the host controller is further for monitoring the at least one default router.

19. The network node of claim 18, wherein the host controller is further for floating the one or more virtual IP addresses between the first network node and a second network node of the addressable network.

20. A network comprising:
   a first subnet;
   a first network node connected to the first subnet;
   a second subnet connected to the first subnet; and
   a second network node connected to the second subnet;
   wherein the first network node comprises:
      a first network interface that is assigned a first network interface IP address that is within a first contiguous IP address range for the first subnet; and
      a host controller in communication with the first network interface, wherein the host controller comprises a loop back interface having assigned to it at least one virtual IP address defined by an IP address range outside of the first contiguous IP address range, and wherein the host controller is for:
- advertising the one or more virtual IP addresses and a corresponding subnet mask to network devices of the addressable network; and
- floating the one or more virtual IP addresses between the first node and the second node.

21. A method for floating a virtual IP address between high availability (HA) clusters of an addressable network, the method comprising:
- advertising a virtual IP address and a corresponding subnet mask from a first HA network node of the addressable network and a source IP address assigned to the first HA network node to other network devices of the addressable network, wherein the first HA network node is connected to a first subnet of the addressable network, and wherein the virtual IP address is not within a contiguous IP address range associated with the first subnet;
- floating, when the first HA network node fails, the virtual IP address to a second HA network node of the addressable network that is connected to a second subnet of the addressable network; and
- advertising the virtual IP address and the corresponding subnet mask from the second HA network node with a source IP address assigned to the second HA network node.

* * * * *